Feb. 25, 1930.  E. RUMPLER  1,748,903
MOTOR VEHICLE
Filed Jan. 20, 1927  2 Sheets-Sheet 1
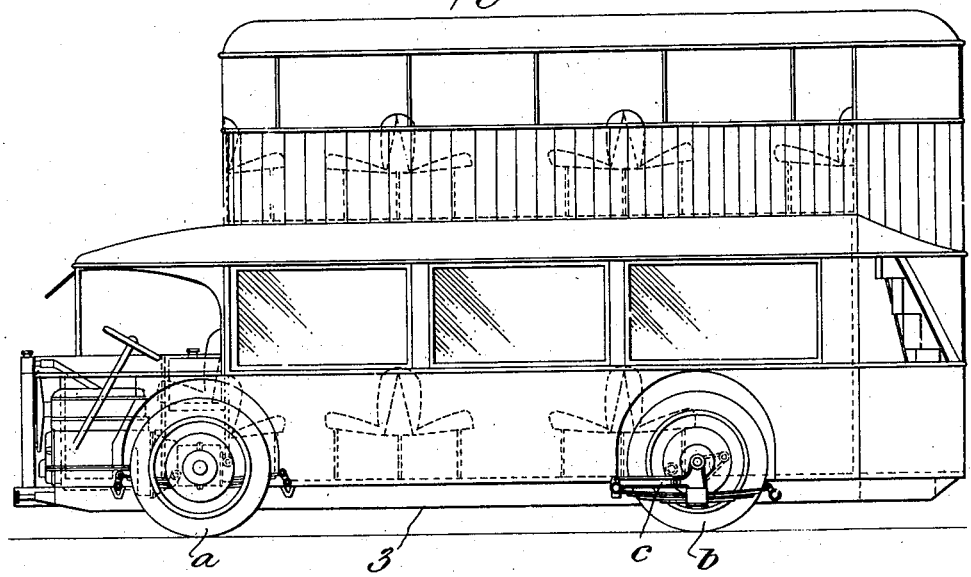
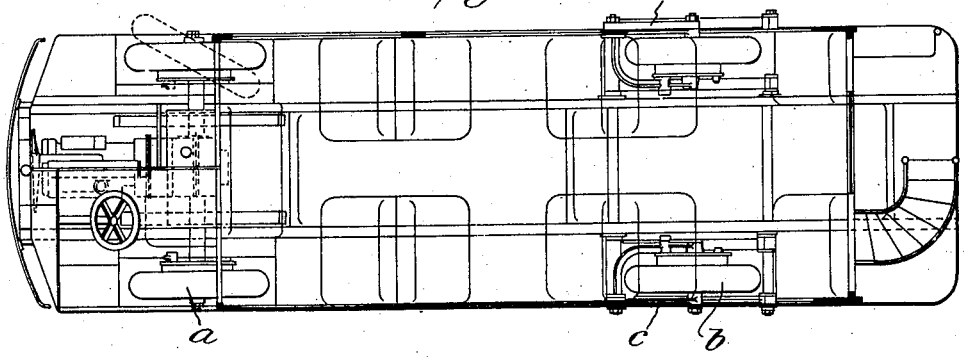
Inventor:
Edmund Rumpler,
By Byrnes Townsend & Brickenstein,
Attorneys.

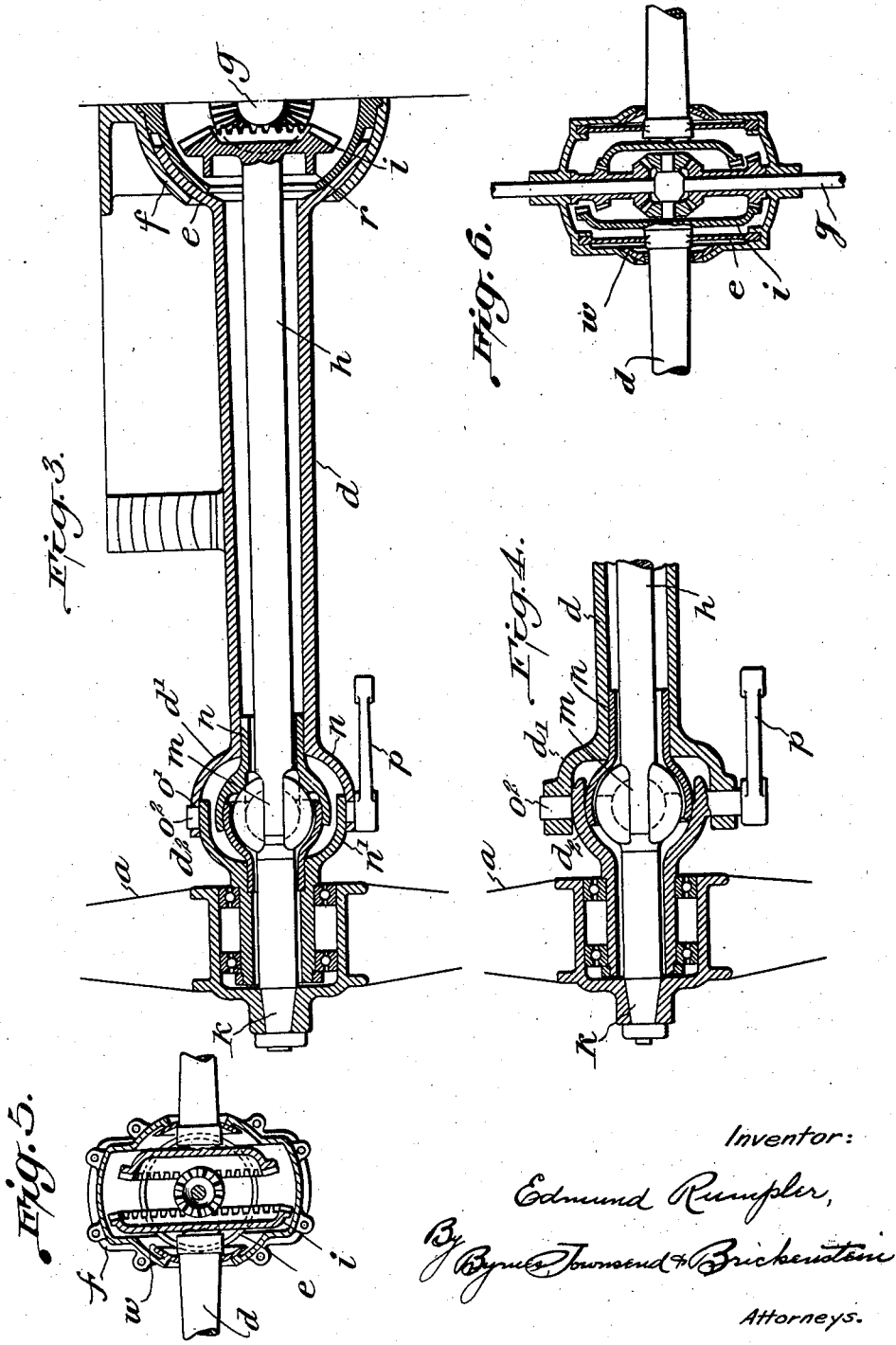

Patented Feb. 25, 1930

1,748,903

UNITED STATES PATENT OFFICE

EDMUND RUMPLER, OF BERLIN, GERMANY

MOTOR VEHICLE

Application filed January 20, 1927, Serial No. 162,348, and in Germany December 5, 1924.

The invention relates to motor vehicles, especially to such as have front wheel drive and of which the road wheels are swinging.

The accompanying drawings show by way of example a construction according to the invention.

Figs. 1 and 2 show a vehicle on which the front wheels are driven and swinging,

Figs. 3 and 4 show the swinging front axle,

Figs. 5 and 6 show the parts permitting the swinging of the axle.

In Figs. 1 and 2, all driving parts such as the motor, clutch, transmission, etc., are located in front of the front driving axle so that the space in the rear of the front axle, which is the space to be occupied by the vehicle body, is free from driving shafts, etc. This arrangement permits the vehicle body to be set lower than in the usual arrangement as the bottom of the body may be placed as low as, or even lower than, the top of the low lying frame without decreasing the road clearance below a safe minimum.

The front wheels are also swinging in a manner as shown by Fig. 3. The swinging axle tubes $d$ which form the front axle terminate in cylindrical guide members $e$ resting in the gear box $f$ in such a way that they can swing around the main driving shaft $g$ of the vehicle. The driving shaft $h$ resting in each axle tube $d$ receives power through bevel gears $i$ in the gear box $f$. The shaft $h$ is connected with a shaft piece $k$ on the driving wheel $a$ through a Cardan joint $m$ which lies in a closed casing formed by the forked end $d'$ of the axle tube $d$ and the cooperating forked end $d^2$ of the tubular stub axle.

The forked portion $d'$ of the axle tube $d$ is provided with bearings $o'$ in which the stub shafts $o^2$ of the stub axle $d^2$ are pivoted. The axis of the steering knuckle thus formed between the axle tube and the stub axle passes through the center of the Cardan joint $m$. The steering arm $p$ is secured to the lower stub shaft $o^2$.

To render the Cardan joint oil-tight, packing members $n$, $n'$ are carried by the members $d'$, $d^2$, respectively, which form the housing for the joint.

As shown in Fig. 4, the forked housing member $d^2$ may be provided with an inner spherical surface for cooperation with the packing member $n$ of the axle tube $d$, and when this construction is employed the packing member $n'$ (Fig. 3) may be omitted.

As shown in Figs. 5 and 6, the cylindrical portions $e$ are practically selected of such small diameter that the driving bevel gears $i$ are situated essentially on the side of the cylindrical portions $e$. The cylinder surface of the guide portions does not enclose the bevel gears, so that a small gear box is obtained that can easily be held tight and has small rubbing surfaces. The cylindrical portion $e$ being so constructed that the axle tube $d$ can be mounted without braces, the tightening therefore is possible by very simple means.

The cylindrical portions $e$ are protected against outside influence by means of special tightening parts $w$ located inside of the gear box $f$. The part $w$ is movable and is pushed steadily against its seat by a spring, the pressure being preferably in the direction from the inside to outside of the gear box. The seat of the tightening part is preferably formed spherical.

As shown in Fig. 1, the not driven rear road wheels are mounted on swing arms $e$ so that each wheel swings independently of the others in a plane that is parallel or nearly parallel to the driving direction.

Through fork-like guiding portions $c^1$ of the swing arm $c$ each wheel is kept in always the same swinging plane. The same result can be obtained by guiding rods or arms, which are connected in a detachable manner, so that after removing one of the arms the road wheel may be easily taken off.

In Figs. 1 and 2 all driving parts such as the motor, clutch, transmission, etc., are located in front of the front driving axle, thereby leaving the space on top of the low lying frame 3 supposed to receive the body free on account of having no driving shafts, etc., the room for the passengers is not restricted and the room below the frame is also free, giving great road clearance.

Having now described my invention, what

I claim and desire to secure by Letters Patent of the United States is:—

1. In a mounting for driven steering wheels of motor vehicles, a main drive shaft extending longitudinally of the vehicle, a gear casing into which said shaft extends, a pair of half-axle tubes having their inner ends pivotally supported on said casing for movement in a substantially vertical plane and about the axis of said main drive shaft as a center, a tubular stub axle at the outer end of the respective half-axles, the adjacent ends of said pair of half-axles and stub axles being forked and pivotally connected to form steering knuckles, a drive shaft in each of said half-axle tubes, means in said casing for connecting each of said drive shafts directly to said main driving shaft, a stub shaft in each of said tubular stub axles, and a Cardan joint connecting each stub shaft to the corresponding drive shaft, the center points of the said Cardan joints lying in the axes of the corresponding steering knuckles, each of said half-axle tubes with its drive shaft comprising the sole supporting means for the inner end of its respective stub axle and stub shaft.

2. In a mounting for driven steering wheels of a motor vehicle, a main drive shaft extending longitudinally of the vehicle, a pair of half-axle tubes and means supporting the inner ends thereof for pivotal movement of the respective half-axle tubes about the axis of said main drive shaft as a center and in a substantially vertical plane, a pair of tubular stub axles, means pivotally connecting the inner end portions of said stub axles with the outer end portions of the respective half-axle tubes, said connecting means restricting the relative movement of said stub axles to angular movement about a vertical axis, whereby said connecting means constitute steering knuckles, a drive shaft in each of said half-axle tubes and a stub shaft in each of said stub axles, a Cardan joint connection between each drive shaft and the cooperating stub shaft, the center points of the said Cardan joints lying in the axes of the corresponding steering knuckles, each of said half-axle tubes with its drive shaft comprising the sole supporting means for the inner end of its respective stub axle and stub shaft, and a differential drive for said drive shafts which comprises a gear carried by said main drive shaft and gears carried by the inner ends of said shafts.

In testimony whereof I have affixed my signature.

EDMUND RUMPLER.

CERTIFICATE OF CORRECTION.

Patent No. 1,748,903.  Granted February 25, 1930, to

EDMUND RUMPLER.

It is hereby certified that error appears in the printed specification of the above numbered patent requiring correction as follows: Page 1, line 12, beginning with the word "In" strike out the paragraph ending in the word "minimum" line 23, and insert instead "In Figs. 1 and 2, the front wheels a are driven, while the non-driven rear wheels b are each of them carried by swinging arms c which can independently swing one from the other in such a manner that the swinging level of each wheel is parallel or nearly parallel to the driving direction"; same page, line 91, beginning with the word "In" strike out the paragraph ending in the word "clearance" in line 99, and insert instead "In Figs. 1 and 2, all driving parts such as the motor, clutch, transmission, etc., are located in front of the front driving axle so that the space in the rear of the front axle, which is the space to be occupied by the vehicle body, is free from driving shafts, etc.

This arrangement permits the vehicle body to be set lower than in the usual arrangement as the bottom of the body may be placed as low as, or even lower than, the top of the low lying frame without decreasing the road clearance below a safe minimum"; and that the said Letters Patent should be read with these corrections therein that the same may conform to the record of the case in the Patent Office.

Signed and sealed this 1st day of April, A. D. 1930.

(Seal)

M. J. Moore,
Acting Commissioner of Patents.